US010505619B2

(12) United States Patent
Pefkianakis et al.

(10) Patent No.: US 10,505,619 B2
(45) Date of Patent: Dec. 10, 2019

(54) SELECTING BEAMS BASED ON CHANNEL MEASUREMENTS (71) Applicant: Hewlett Packard Enterprise Development LP, Houston, TX (US)

(72) Inventors: Ioannis Pefkianakis, Palo Alto, CA (US); Sanjib Sur, Ripon, WI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/885,306

(22) Filed: Jan. 31, 2018

(65) Prior Publication Data
US 2019/0238207 A1    Aug. 1, 2019

(51) Int. Cl.
*H04W 24/10* (2009.01)
*H04B 7/06* (2006.01)
(Continued)

(52) U.S. Cl.
CPC ......... *H04B 7/0695* (2013.01); *H04B 7/0619* (2013.01); *H04W 24/10* (2013.01); *H04W 36/30* (2013.01); *H04W 24/08* (2013.01)

(58) Field of Classification Search
CPC .. H04B 7/0695; H04B 7/0619; H04B 7/0639; H04B 7/088; H04B 7/0408; H04W 24/10;
(Continued)

(56) References Cited

U.S. PATENT DOCUMENTS

2015/0282001 A1* 10/2015 Kwak ................. H04B 7/0617
370/229
2016/0381570 A1   12/2016 Lysejko et al.
(Continued)

FOREIGN PATENT DOCUMENTS

CN        105556869        11/2016
CN        106972877         7/2017
WO     WO-2017107593        6/2017

OTHER PUBLICATIONS

Steinmetzer, D. et al., Mitigating Lateral Interference: Adaptive Beam Switching for Robust Millimeter-wave Networks, (Research Paper), Oct. 16, 2017, 6 Pgs.
(Continued)

*Primary Examiner* — Kibrom T Hailu
(74) *Attorney, Agent, or Firm* — Brooks, Cameron & Huebsch, PLLC (57) ABSTRACT

An example system may comprise a millimeter wave (mmWave) transmitting device including instructions executable to: identify a plurality of mmWave signal transmission paths from the mmWave transmitting device to a receiving device; collect a channel measurement for each beam of a first portion of beams available at the mmWave transmitting device at each signal transmission path of the plurality of mmWave signal transmission paths; determine a plurality of properties of each signal transmission path of the plurality of mmWave signal transmission paths utilizing the corresponding channel measurements; predict, based on the plurality of properties, a signal metric for a second portion of the beams; and select, based on the predicted signal metric, a beam from the beams to be utilized to transmit a signal to the receiving device.

20 Claims, 3 Drawing Sheets (51) Int. Cl.
*H04W 36/30* (2009.01)
*H04W 24/08* (2009.01)

(58) Field of Classification Search
CPC ... H04W 36/30; H04W 24/08; H04W 72/046; H04W 16/28
See application file for complete search history.

(56) References Cited

U.S. PATENT DOCUMENTS

| | | | |
|---|---|---|---|
| 2017/0238294 A1* | 8/2017 | Lim | H04B 7/0695 370/277 |
| 2017/0331670 A1 | 11/2017 | Parkvall et al. | |
| 2018/0192426 A1* | 7/2018 | Ryoo | H04L 5/00 |
| 2018/0234153 A1* | 8/2018 | Lincoln | H04B 7/0486 |
| 2018/0269956 A1* | 9/2018 | Akkarakaran | H04B 7/088 |

OTHER PUBLICATIONS

Zhu et al., "Demystifying 60GHz Outdoor Picocells", MobiCom '14 Proceedings of the 20th annual international conference on Mobile computing and networking, 2014, 12 pages.
Zhang et al., "OpenMili: a 60 GHz Software Radio Platform with a Reconfigurable Phased-Array Antenna", MobiCom '16 Proceedings of the 22nd Annual International Conference on Mobile Computing and Networking, 2016, 14 pages.
Xu et al., "Spatial and Temporal Characteristics of 60-GHz Indoor Channels", IEEE Journal on Selected Areas in Communications, Vol. 20, Issue 3, Sep. 2006, pp. 620-630.
Wei et al., "Pose Information Assisted 60 GHz Networks: Towards Seamless Coverage and Mobility Support", MobiCom '17 Proceedings of the 23rd Annual International Conference on Mobile Computing and Networking, 2017, 14 pages.
Wang et al., "Image Quality Assessment: From Error Visibility to Structural Similarity", IEEE Transactions on Image Processing, vol. 13, Issue 4, Apr. 2004, 14 pages.
Wang et al., "Beamforming Codebook Design and Performance Evaluation for 60GHz Wideband WPANs", IEEE 70th Vehicular Technology Conference Fall, 2009, pp. 1390-1399.
Sur et al., "WiFi-Assisted 60 GHz Wireless Networks", MobiCom '17 Proceedings of the 23rd Annual International Conference on Mobile Computing and Networking, 2017, 14 pages.
Sur et al., "BeamSpy: Enabling Robust 60 GHz Links Under Blockage", NSDI'16 Proceedings of the 13th Usenix Conference on Networked Systems Design and Implementation, 2016, pp. 193-206.
Sur et al., "60 GHz Indoor Networking through Flexible Beams: A Link-Level Profiling", Sigmetrics '15 Proceedings of the 2015 ACM Sigmetrics International Conference on Measurement and Modeling of Computer Systems, 2015, 14 pages.
Rasekh et al., "Noncoherent mmWave Path Tracking", HotMobile '17 Proceedings of the 18th International Workshop on Mobile Computing Systems and Applications, 2017, pp. 13-18.
Rappaport et al., "Millimeter Wave Wireless Communications", Prentice Hall, 2014, 80 pages.
Rappaport et al., "Millimeter Wave Mobile Communications for 5G Cellular: It Will Work!", IEEE Access vol. 1, 2013, pp. 335-349.
Rappaport et al., "Broadband Millimeter-Wave Propagation Measurements and Models Using Adaptive-Beam Antennas for Outdoor Urban Cellular Communications", IEEE Transactions on Antennas and Propagation, vol. 61, Issue 4, pp. 1850-1859.
Rappaport et al., "38 GHz and 60 GHz Angle-Dependent Propagation for Cellular and Peer-to-Peer Wireless Communications", International Conference on Communications, 2012, 7 pages.
Ramasamy et al., "Compressive Tracking with 1000-element Arrays: A Framework for Multi-Gbps MMwave Cellular Downlinks", In Allerton Conference on Communication, Control and Computing, vol. 50, 2012, pp. 690-697.
Ramasamy et al., "Compressive Adaptation of Large Steerable Arrays", In Information Theory and Applications Workshop (ITA), 2012, 6 pages.
R. C. Hansen, "Phased Array Antennas", John Wiley & Sons, Inc., 2009, available online at <https://onlinelibrary.wiley.com/doi/pdf/10.1002/9780470529188.fmatter>, 16 pages.
P. F. M. Smulders, "Statistical Characterization of 60-GHz Indoor Radio Channels", IEEE Transactions on Antennas and Propagation, vol. 57, Issue 10, Oct. 2009, pp. 2820-2829.
Nitsche et al., "Steering with Eyes Closed: mm-Wave Beam Steering without In-Band Measurement", In IEEE Conference on Computer Communications, 2015, 9 pages.
Monica Alleven, "Verizon applauds FCC chairman's move to 5G spectrum", Oct 5, 2015, 3 pages.
Marzi et al., "Compressive Channel Estimation and Tracking for Large Arrays in mm-Wave Picocells" IEEE Journal of Selected Topics in Signal Processing, vol. 10, Issue 3, Apr. 2016, 13 pages.
Li et al., "On the Efficient BeamForming Training for 60GHz Wireless Personal Area Networks", IEEE Transactions on Wireless Communications, Vol. 12, Issue 2, Feb. 2013, pp. 504-515.
Hassanieh et al., "Agile Millimeter Wave Networks with Provable Guarantees", 2017, 14 pages.
Gantovnik et al., "A Genetic Algorithm for Mixed Integer Nonlinear Programming Problems Using Separate Constraint Approximations", In AIAA Journal, vol. 43(8), 2003, 23 pages.
ECMA International, "Standard ECMA-387: High Rate 60 GHz PHY, MAC and PALs", 2010, available online at <https://www.ecma-international.org/publicationsffiles/ECMA-ST/ECMA-387.pdf>, 302 pages.
Collonge et al., "Influence of the Human Activity on Wide-Band Characteristics of the 60 GHz Indoor Radio Channel", IEEE Transactions on Wireless Communications, vol. 3, Issue 6, Nov. 2004, pp. 2396-2406.
Choubey et al., "Introducing Facebook's new terrestrial connectivity systems-Terragraph and Project ARIES", Apr. 13, 2016, 3 pages.
Cecilia Sulhoff ,"FCC Promotes Higher Frequency Spectrum for Future Wireless Technology", Oct. 22, 2015, 2 pages.
Cai et al., "Orthogonal Matching Pursuit for Sparse Signal Recovery With Noise", IEEE Transactions on Information Theory, vol. 57, Issue 7, Jul. 2011, pp. 4680-4688.
Anderson et al., "In-Building Wideband Partition Loss Measurements at 2.5 and 60 GHz", IEEE Transactions on Wireless Communications,vol. 3, Issue 3, May 2004, pp. 922-928.
Abari et al., "Millimeter Wave Communications: From Point-to-Point Links to Agile Network Connections", HotNets 2016-Proceedings of the 15th ACM Workshop on Hot Topics in Networks, 7 pages.
European Search Report and Search Opinion Received for EP Application No. 19152856.1, dated Sep. 3, 2019, 18 pages.

* cited by examiner

SELECTING BEAMS BASED ON CHANNEL MEASUREMENTS

BACKGROUND

Global demand for mobile data continues to congest Long Term Evolution (LTE) standard and Wi-Fi wireless data networks. The frequencies on the radio frequency spectrum under six Gigahertz (GHz) utilized by fourth generation (4G) LTE and Wi-Fi wireless data networks are becoming crowded. On the other hand, there is multi-GHz of freely available spectrum at the millimeter-wave (mmWave) frequency band between 30 GHz and 300 GHz. For example, there are 7 GHz of unlicensed spectrum at the 60 GHz mmWave frequency band. Further, multiple standardization efforts, such as IEEE 802.11 ad, 802.15.3C, and/or ECMA, and off-the-shelf products operating on the 60 GHz mmWave spectrum may offer 7 Gigabits (Gbps) of wireless bit-rate.

DETAILED DESCRIPTION

MmWaves may differ from wireless local area network (WLAN) signal waves. MmWaves may have a relatively shorter wavelength than a WLAN signal wavelength. For example, the mmWaves may have a wavelength of one to ten millimeters (mm). At 60 GHz, the mmWaves may have a wavelength of five mm. In contrast, a WLAN signal may have a wavelength in the tens of millimeters. For example, at 2.4 GHz the wavelength may be 12.5 centimeters (cm) and at 5 GHz the bandwidth may be six cm.

MmWaves are susceptible to channel propagation loss by, among other factors, atmospheric attenuation. The relatively higher frequency and relatively shorter wavelength of the mmWave versus a Wi-Fi signal may render the mmWave relatively more vulnerable to channel propagation loss than Wi-Fi signals. In an example, a 60 GHz mmWave data transfer link may suffer from 21.6 decibels (dB) higher signal path loss when compared to a 5 GHz Wi-Fi signal under the same environmental conditions.

Signal path loss may degrade and/or interrupt the transfer of data. For example, if an access point (AP) utilizes mmWaves to transfer data to and/or from a client device associated with the AP, then signal path loss between the two may interrupt the transfer of data. As used herein, the term "access point (AP)", can, for example, refer to a networking device that allows a client device to connect to a wired or wireless network. An AP can include a processor, memory, and input/output interfaces, including wired network interfaces such as IEEE 802.3 Ethernet interfaces, as well as wireless network interfaces such as IEEE 802.11 wireless interfaces, although examples of the disclosure are not limited to such interfaces. An AP can include memory, including read-write memory, and a hierarch of persistent memory such as ROM, EPROM, and Flash memory.

As used herein, AP generally refers to receiving points for any known or convenient wireless access technology which may later become known. Specifically, the term AP is not intended to be limited to IEEE 802.11-based APs. APs generally function as an electronic device that is adapted to allow wireless communication devices to connect to a wired network via various communication standards.

As used herein, the term "client device" can, for example, refer to a device including a processor, memory, and input/output interfaces for wired and/or wireless communication. A client device may include a laptop computer, a desktop computer, a mobile device, and/or other wireless devices, although examples of the disclosure are not limited to such devices. A mobile device may refer to devices that are (or may be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

An AP and/or a client device that utilized mmWaves to communicate data may include and/or utilize a phased-array antenna. A phased-array antenna may utilize multiple omni-directional antennas that may focus radio frequency energy towards specific spatial directions. The multiple omni-directional antennas may be electronically steered to point towards the specific spatial directions without physically moving the antennas. An AP and/or client device may utilize the phased-array antenna to create a fine-grained mmWave beam between each other to transfer data.

However, the fine-grained mmWave beam produced by the phased-array antenna may be susceptible to signal path loss from mobility (e.g., a change in the location and/or orientation of the transmitting and/or receiving device) due to the focused nature of the mmWave beam. Additionally, the mmWave beam may be susceptible to signal path loss from blockage, due to the properties of the high frequency/ short wavelength mmWave, by people and/or things in the beam path. For example, when a human body blocks a 60 GHz mmWave beam path, the signal strength of the path may drop by 20 dB to 30 dB.

In order to maintain signal strength approaches that search-for and steer-to a highest signal strength beam direction may be utilized by the mmWave device (e.g., AP and/or client device). However, the computational overhead of searching may grow quadratically with the amount of potential beam directions for the phased-array antenna, consuming the valuable Gbps channel time. Further, upon identifying the beam direction, the mmWave device may run a physical layer (PHY) rate adaptation determination. The PHY rate adaptation determination may seek to identify a highest throughput PHY rate (e.g., Modulation and Coding Scheme (MCS)). APs operating on 60 GHz band compatible with IEEE 802.11ad may have a convergence time to the highest-throughput beam and PHY rate setting in the order of seconds utilizing these approaches. Such a delay may result in poor 60 GHz mmWave data transmission link performance.

In contrast, examples of the present disclosure may predict mmWave beam performance and may utilize the predictions to identify a beam to be utilized to transmit a signal without searching and probing every beam path available at an mmWave transmitting device. An example of the present disclosure may include a system including an mmWave transmitting device including instructions executable to identify a plurality of mmWave signal transmission paths from the mmWave transmitting device to a receiving device and collect channel measurements for a first portion of beams at each signal transmission path. The system may include an mmWave transmitting device including instructions executable to determine properties of each signal transmission path utilizing the corresponding channel measurements and predict, based on the properties, a signal metric for other beams (e.g., beams that have not had a channel measurement collected from them). The system may include an mmWave transmitting device including instructions executable to select a beam to be utilized to transmit a signal to the receiving device based on the predicted signal metrics.

Figure 1:
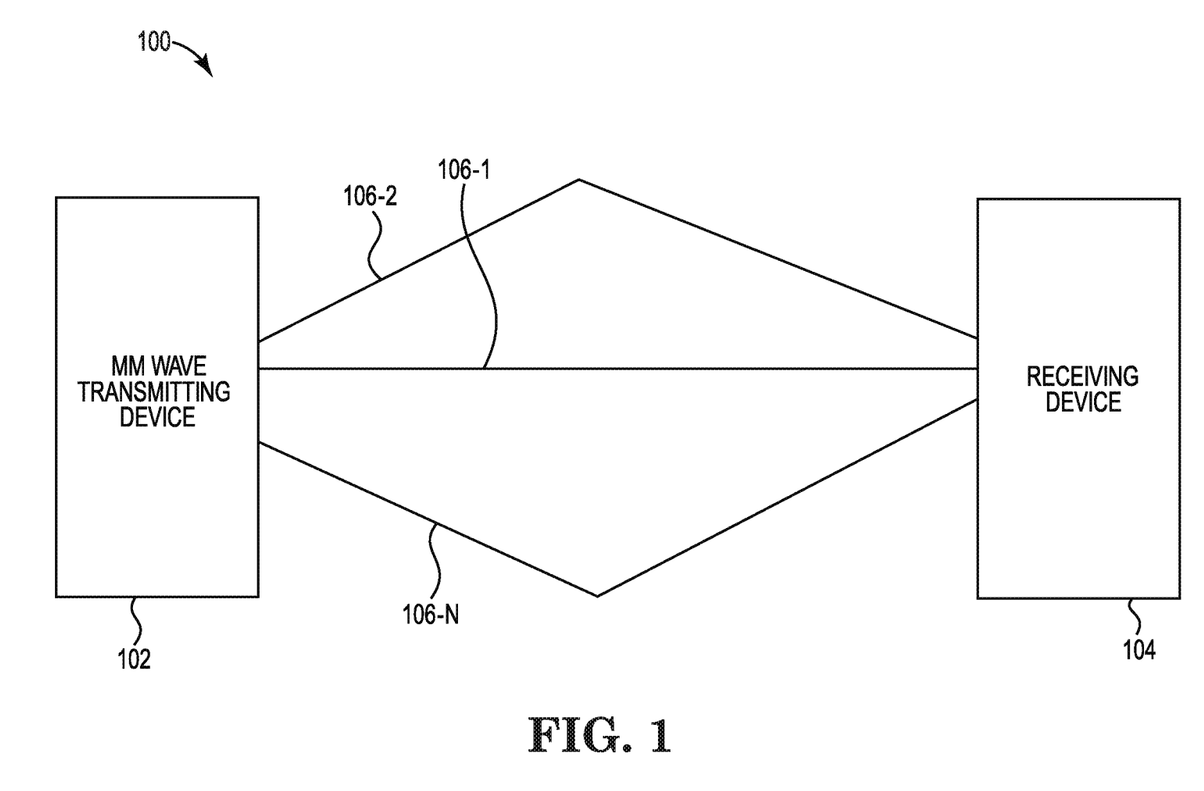
FIG. 1 illustrates an example of a system for channel measurement beam selections consistent with the disclosure.

FIG. 1 illustrates an example of a system 100 for channel measurement beam selections consistent with the disclosure. The system 100 is not limited to a particular example described herein and may include additional features such as those described in the non-transitory machine-readable storage medium described in FIG. 2 and/or the method 340 described in FIG. 3.

System 100 may include an mmWave transmitting device 102. The mmWave transmitting device 102 may include and/or utilize a phased-array antenna for steering focused beams of mmWaves carrying data signals to a receiving device. The mmWave transmitting device 102 may include an access point (AP). For example, the mmWave transmitting device 102 may include an AP that provides wireless access to a computing network. The mmWave transmitting device 102 may include an AP compatible with IEEE 802.11ad standard. The mmWave transmitting device 102 may include a 60 GHz AP. The mmWave transmitting device 102 may support transmitting data utilizing a plurality of mmWave beams. The mmWave transmitting device 102 may, for example support 64 mmWave beams in various static and dynamic settings. However, examples of the mmWave transmitting device 102 are not limited to any particular amount of mmWave beams.

The mmWave transmitting device 102 may include a memory resource and a processing resource. The memory resource may include be any type of volatile or non-volatile memory or storage, such as random access memory (RAM), flash memory, read-only memory (ROM), storage volumes, a hard disk, or a combination thereof. The memory resource may store the instructions. The instructions may be executable by the processing resource to perform various operations.

The system 100 may include a receiving device 104. The receiving device 104 may include a device that can receive data from and/or send data to the mmWave transmitting device 102 utilizing the mmWave beam connection. The receiving device 104 may include a client device that is associated with a mmWave transmitting device 102 AP. The receiving device 104 may include a laptop computer, a desktop computer, a mobile computing device, smart phone, tablet computer, and/or other wireless devices.

The system 100 may include a plurality of mmWave signal transmission paths 106-1, 106-2, . . . 106-N. The plurality of mmWave signal transmission paths 106-1, 106-2, . . . 106-N may include the physical paths of a mmWave channel between the mmWave transmitting device 102 and the receiving device 104. That is, each one of the plurality of mmWave signal transmission paths 106-1, 106-2, . . . 106-N may include a distinct physical path traversed by a mmWave beam and/or a signal sent through a mmWave beam between the transmitting device 102 and the receiving device 104. The number of physical paths between the transmitting device 102 and the receiving device 104 may be two or three in some examples.

The plurality of mmWave signal transmission paths 106-1, 106-2, . . . 106-N may include the dominant physical paths of an mmWave channel between the mmWave transmitting device 102 and the receiving device 104. A dominant physical path may include a line-of-sight physical path. A dominant physical path may include physical paths that travel from the transmitting device 102, reflect off something in the environment and arrive at the receiving device 104. A dominant physical path may a path that provides a direct path from the transmitting device 102 to receiving device 104 with a strong signal and decreased environmental interference relative to other physical paths. The amount of dominant physical paths may be less than the total amount of paths between the transmitting device 102 and the receiving device 104.

The system 100 may perform channel measurement beam selections based on the underlying physical paths of the mmWave signal transmission paths 106-1, 106-2, . . . 106-N, along which signals travel from the transmitting device 102 to receiving device 104, remain the same despite channel gain and phase changing with steering different mmWave beams in different directions. If the mmWave transmitting device 102 and/or the receiving device 104 can extract properties, such as complex gains and directionality of the dominating paths, it can select a relatively strongest beam to align with the path without scanning through the entire physical space between the mmWave transmitting device 102 and the receiving device 104.

As described above, the mmWave transmitting device 102 may include a phased-array antenna including an mmWave radio utilizing phased-array beamforming to focus radio frequency energy. For a one-dimensional linear phased-array antenna, the gain pattern of the $m^{th}$ beam may be expressed as:

$$A_m(\theta) = \sum_{n=1}^{N} w(n, m) \cdot e^{(j2\pi nd\cos\theta/\lambda)} \qquad \text{Eq. 1}$$

where N is the number of antenna elements with uniform separation d and $\lambda$ is the wavelength of the wireless signal generated by the antenna. The weights w(n,m) may be tuned to generate different beams with diverse radiation patterns. mmWave transmitting device 102 may utilize a two dimensional phased-array antenna, and thus may generate a radiation pattern in both azimuth and elevation direction denoted by $A_m$ ($\theta^{az}, \theta^{el}$). Beam radiation patterns of the mmWave beams may have an irregular shape due to discrete configuration weights. However, for each beam, the beam pattern $A_m$ may be fixed during the time of design of the mmWave transmitting device 102. As such, the pattern $A_m$ may be known to and/or saved at the mmWave transmitting device 102.

As described above, an mmWave transmitting device 102 may utilize a plurality of mmWave signal transmission paths 106-1, 106-2, . . . 106-N to transmit signals to the receiving device 104. The plurality of mmWave signal transmission paths may be expressed as K and K may be upper bounded by three. The mmWave channel created by the $m^{th}$ mmWave transmit beam may be determined by $$h_m(\theta) = \sum_{k=1}^{k} \sum_{\theta} A_m(\theta) \cdot g_k(\theta_k) \cdot \delta(\theta - \theta_k) \qquad \text{Eq. 2}$$

where $g_k(\theta_k)$ denotes the complex channel gain of the $k^{th}$ path towards directions $\theta_k$. The gain $g_k$ may equal $a_k e^{j\phi_k}$ for path amplitude $a_k$ and phase $\phi_k$. The performance of a mmWave beam may depend on its spatial alignment with the K paths of the mmWave channel, and such alignment may be determined by a Dirac delta function $\delta(\theta-\theta_k)$. Each of the mmWave signal transmission paths 106-1, 106-2, ... 106-N can traverse both azimuth ($\theta_k^{az}$) and elevation ($\theta_k^{el}$) directions. Thus, the $k^{th}$ path may be fully characterized by a 4-tuple in the form of ($a_k$, $\phi_k$, $\theta_k^{az}$, $\theta_k^{el}$). Since the beam pattern $A_m$ may be known a priori, the mmWave transmitting device 102 may predict a strongest beam without scanning through an entire space by extracting the 4-tuples described above for each of the K mmWave signal transmission paths 106-1, 106-2, ... 106-N in the mmWave channel.

The mmWave transmitting device 102 may include instructions executable to identify the plurality of mmWave signal transmission paths 106-1, 106-2, ... 106-N from the mmWave transmitting device 102 to the receiving device 104. The plurality of mmWave signal transmission paths 106-1, 106-2, ... 106-N may be distinct from one another. Further, the plurality of mmWave signal transmission paths 106-1, 106-2, ... 106-N may include the line-of-sight path and/or other dominating paths between the mmWave transmitting device 102 to the receiving device 104. The plurality of mmWave signal transmission paths 106-1, 106-2, ... 106-N may be expressed as K distinct paths which each of the distinct paths is able to be uniquely characterized by the 4-tuple of properties ($a_k$, $\phi_k$, $\theta_k^{az}$, $\theta_k^{el}$), where k=1, 2, ... K.

The mmWave transmitting device 102 may include instructions executable to collect a channel measurement for each beam of a first portion of beams available at the mmWave transmitting device 102 at each signal transmission path of the plurality of mmWave signal transmission paths 106-1, 106-2, ... 106-N. Collecting a channel measurement may include probing M beams with the mmWave transmitting device 102. Collecting the channel measurement may include sending a packet from the mmWave transmitting device 102 to the receiving device 104 using a channel being measured, collecting channel measurements at the receiving device 104, receiving the channel measurements back at the mmWave transmitting device 102 from the receiving device 104. The channel measurement may include a channel impulse response (CIR) measurement of the beam utilized by the transmitting device 102 to send the probing packet to the receiving device 104.

Collecting a channel measurement of the first portion of beams may include probing M beams with the mmWave transmitting device 102. Each of the channel measurements of the $m^{th}$ beam may take the form given in Eq. 2. The channel measurement may include a multi-GHz channel measurement capturing the information of each individual mmWave signal transmission path. For example, each individual mmWave signal transmission path 106-1, 106-2, ... 106-N may traverse a different length and arrive at the receiving device 104 with a slight delay relative to one another and thus may be measured separately in a time-domain. For example, in an example where the mmWave transmitting device 102 is an 801.11ad device a 1.76 GHz channel measurement may be utilized enabling the receiving device to measure each mmWave signal transmission path 106-1, 106-2, ... 106-N with an arrival time difference of 0.57 nanoseconds (ns).

The first portion of beams may be less than the amount of beams available for use at the mmWave transmitting device 102. The amount of channel measurements, or the amount of beams to be probed may be independent of the total amount of beams available at the mmWave transmitting device 102. Since four variables are solved for each of the K mmWave signal transmission paths 106-1, 106-2, ... 106-N to define the properties of the paths, the amount of beams in the first portion of beams that are probed may be determined as 4K beams. That is, the amount of beams in the first portion of beams that have their channels measured may be four multiplied by the amount of K mmWave signal transmission paths 106-1, 106-2, ... 106-N. For example, where three dominant mmWave signal transmission paths 106-1, 106-2, ... 106-N are identified between the mmWave transmitting device 102 and the receiving device 104, four multiplied by three, or twelve total beams will be the first portion of beams. Again, this amount is independent of the amount of beams available at the mmWave transmitting device 102.

The mmWave beams that are selected to be in the first portion of beams to be probed to collect the channel measurement may be selected based on their corresponding radiation patterns. Convergence may be achieved when the measured channels are as much uncorrelated as possible. As such, the mmWave transmitting device 102 may select 4K mmWave beams with a highest degree of non-overlapping radiation patterns relative to one another. In some examples, a structural similarity metric (SSIM) of each mmWave beam may be utilized to characterize a structural overlap of a radiation pattern of each beam available at the mmWave transmitting device 102. The mmWave transmitting device 102 may identify an additional 4K−1 mmWave beams from the set of N beams available at the mmWave transmitting device 102 with the lowest SSIM with a current beam to be part of the first portion of beams utilized in collecting the channel measurements. As described above, the radiation pattern of the set of N beams available at the mmWave transmitting device 102 is known a priori and/or is saved at the mmWave transmitting device 102. As such, the SSIM ranking may be computed offline and may utilize a table lookup operation at runtime.

The mmWave transmitting device 102 may include instructions executable to determine a plurality of properties of each mmWave signal transmission path of the plurality of mmWave signal transmission paths 106-1, 106-2, ... 106-N. The properties of each mmWave signal transmission path of the plurality of mmWave signal transmission paths 106-1, 106-2, ... 106-N may be determined utilizing the corresponding channel measurements.

Determining the plurality of properties of each signal transmission path 106-1, 106-2, ... 106-N may include determining a path-characterizing four-tuple of each single path of the plurality of mmWave signal transmission paths 106-1, 106-2, ... 106-N. The four-tuple may include a path amplitude ($a_k$) of the corresponding mmWave signal transmission path. The four-tuple may include a path phase ($\phi_k$) of the corresponding mmWave signal transmission path. The four-tuple may include an azimuth direction ($\theta_k^{az}$) of the corresponding mmWave signal transmission path. The four-tuple may include an elevation direction ($\theta_k^{el}$) of the corresponding mmWave signal transmission path.

The complex gain (e.g., $a_k$, $\phi_k$) of each path may not be distinctly measurable without knowledge of the directions (e.g., $\theta_k^{az}$, $\theta_k^{el}$) that the corresponding mmWave signal transmission path traversed. For example, the channel measurement of the $m^{th}$ beam may capture the information about the gain of the path convoluted with the complex gain of the beam pattern as described in Eq. 2. Therefore, while the radiation pattern of each mmWave beam available at the mmWave transmitting device 102 is known and/or fixed a priori, the beam gain used to amplify the mmWave signal transmission path may depend on the unknown direction (e.g., $\theta_k^{az}$, $\theta_k^{el}$) of the path.

The 4-tuple of properties of each signal path remains the same across channel measurements from other mmWave beams. However, the amplification gain of the path due to different radiation patterns may change across channel measurements from different mmWave beams. As such, the four-tuple of properties of each signal path of the plurality of mmWave signal transmission paths 106-1, 106-2, . . . 106-N may be determined utilizing a dual-space time analysis of the corresponding collected channel measurements. For example, the contribution of the $m^{th}$ beam on the $k^{th}$ path can be expressed as an amplification model:

$$P_{(m,k)} = A_m(\theta_k^{az}, \theta_k^{el}) \cdot a_k e^{(j\Phi_k)}. \quad \text{Eq. 3}$$

In an example, the channel measurement of the $K^{th}$ mmWave signal transmission path from the measured channel of the $m^{th}$ beam may be given by $P_{(m,k)}^c$. However, there may be many possible directions of the mmWave signal transmission path which can have similar amplitude and phase responses after amplification by the mmWave beam pattern. By collecting channel measurements from the additional 4K mmWave beams of the first portion of beams that amplify the same physical path, the mmWave transmitting device 102 may be able to extract the 4-tuple of the $K^{th}$ path. For example, if the channel measurements from M beams are available at the mmWave transmitting device 102, then the 4-tuple of the $K^{th}$ path may be extracted from the optimization:

$$\{a_k, \phi_k, \theta_k^{az}, \theta_k^{el}\} *= \underset{\{a_k, \phi_k, \theta_k^{az}, \theta_k^{el}\}}{\text{argmin}} \|\{P_{(m,k)} - P_{(m,k)}^c\}_{m=1}^M\|^2 \quad \text{Eq. 4}$$

$$\text{s.t.} -\pi \leq \phi_k \leq \pi, 0 < a_k \leq \frac{\max|P_{(m,k)}^c|}{\min|A_m|} \forall m \in [1, M]$$

where the bound on the mmWave signal transmission path phase and amplitude are fixed during the Eq. 4 solver time. The upper bound on the amplitude $a_k$ may be determined based on the ratio between the measured amplitude and the absolute normalized minimum strength of the $m^{th}$ mmWave beam. Since $A_m(\theta^{az}, \theta^{el})$ for each mmWave beam may be measured with a finite resolution on the azimuth and elevation angle, the Eq. 4 method may be non-convex and constrained over the discrete grid of directions $(\theta_k^{az}, \theta_k^{el})$. A genetic algorithm method with mixed integer constraints may be applied and local minima convergence may be addressed by applying a random variable initialization and multiple seed generation. Eq. 4 may be solved by the mmWave transmitting device 102 for each of the K paths and K may be bounded to two or three dominating signal paths.

The mmWave transmitting device 102 may include instructions executable to predict a signal metric for a second portion of the beams. The second portion of the beams may be a remaining portion of the beams, other than the first portion, available at the mmWave transmitting device 102. The second portion of the beams may include the mmWave beams that were not utilized in the channel measurements and were not probed.

The signal metric for each of the second portion of beams may be determined based on the plurality of properties of each mmWave signal transmission path 106-1, 106-2, . . . 106-N determined by the mmWave transmitting device 102. The signal metric may be a metric of the predicted performance of each individual beam available at the mmWave transmitting device 102. The signal metric may include a predicted signal strength achieved utilizing each individual beam across each mmWave signal transmission path 106-1, 106-2, . . . 106-N. For example, the signal metric may include a predicted signal to noise ratio (SNR) achieved utilizing each individual beam across each mmWave signal transmission path 106-1, 106-2, . . . 106-N.

In some examples, the first portion and/or the second portion of mmWave beams may be ranked. The ranking of each beam may be based on the signal metric corresponding to the beam. The ranking may serve as a list of candidates for utilization to transmit a signal to the receiving device 104 in response to a SNR of a currently utilized beam dropping below a threshold SNR level.

The mmWave transmitting device 102 may include instructions executable to select a beam from the beams available at the mmWave transmitting device 102 to be utilized to transmit a signal to the receiving device 104. The beam may be selected based on the predicted signal metric. For example, the mmWave transmitting device 102 may identify a beam with a predicted signal metric indicating that it will provide a strongest signal relative to the other beams available at the mmWave transmitting device 102.

The mmWave transmitting device 102 may immediately discontinue use of a currently utilized mmWave beam and begin utilizing the selected mmWave beam upon its selection. Alternatively, the mmWave transmitting device 102 may discontinue use of a currently utilized beam and begin utilizing the selected mmWave beam after the SNR mmWave transmitting device 102 has crossed a threshold SNR level.

The above described system 100 for channel measurement beam selections may be triggered by a triggering event. For example, the mmWave transmitting device 102 may include instructions executable to monitor the CIR feedback from the receiving device 104 to detect changes in SNR of a currently utilized beam. The triggering event may include the mmWave transmitting device 102 detecting that the SNR of a currently utilized beam has crossed a threshold SNR amount and/or has changed by a threshold SNR amount. For example, when the mmWave transmitting device 102 detects an SNR change of an average SNR difference between two beam options, the operations of system 100 may be triggered. In an example, the mmWave transmitting device 100 may begin the process of collecting the channel measurement responsive to detecting a one point five dB change in the SNR of the currently utilized channel.

Figure 2:
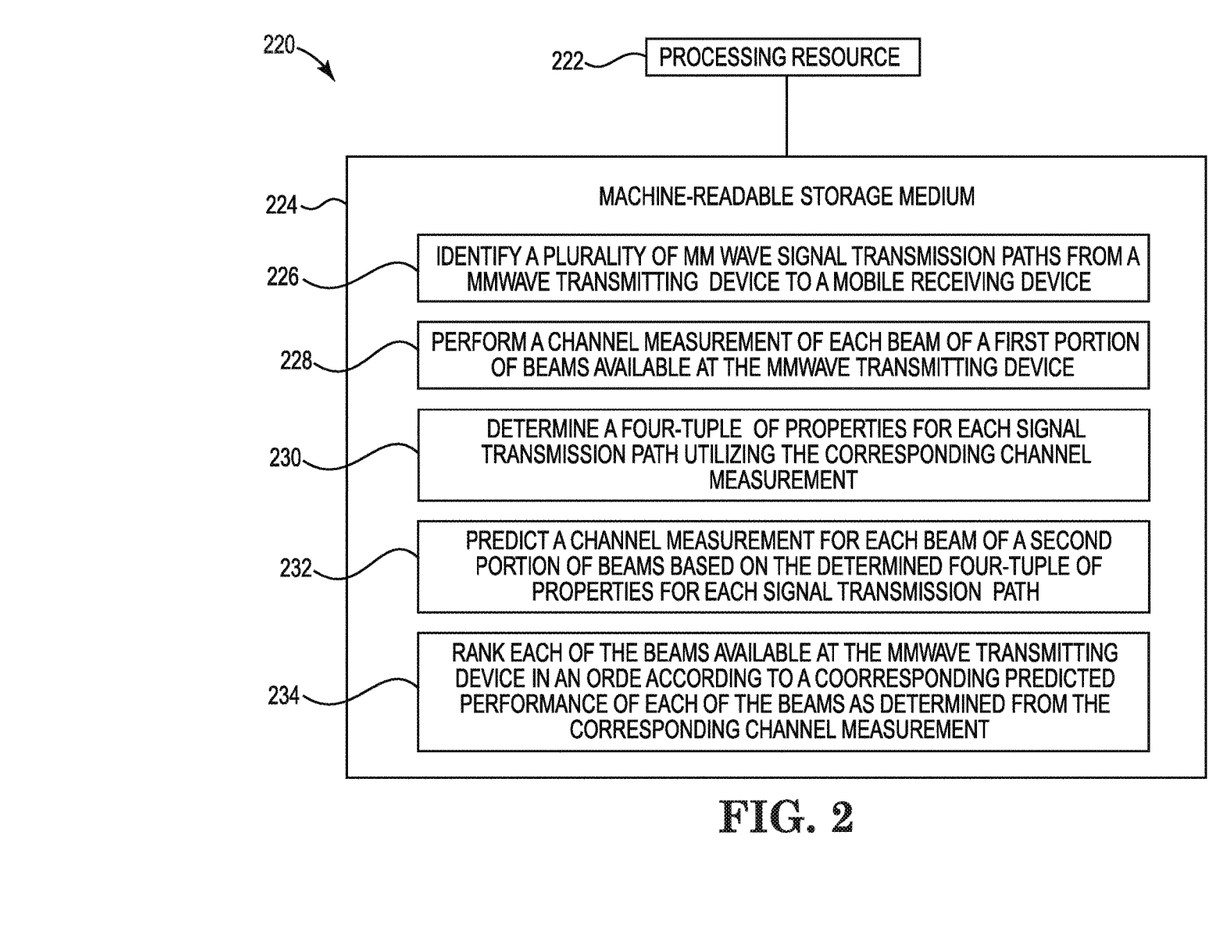
FIG. 2 illustrates a diagram of an example of a processing resource and a non-transitory machine-readable medium for channel measurement beam selections consistent with the disclosure.

FIG. 2 illustrates a network device 220 comprising a processing resource 222 and a non-transitory machine-readable medium 224 for channel measurement beam selections consistent with the disclosure. A memory resource, such as the non-transitory machine-readable medium 224, may be used to store instructions (e.g., 226, 228, 230, 232, 234) executed by the processing resource 222 to perform the operations as described herein. The operations are not limited to a particular example described herein and may include additional operations such as those described in the system 100 described in FIG. 1 and the method 340 described in FIG. 3.

A processing resource 222 may execute the instructions stored on the non-transitory machine readable medium 224. The non-transitory machine-readable medium 224 may be any type of volatile or non-volatile memory or storage, such as random access memory (RAM), flash memory, read-only memory (ROM), storage volumes, a hard disk, or a combination thereof.

The machine-readable medium 224 may store instructions 226 executable by the processing resource 222 to identify an mmWave signal transmission path from a mmWave transmitting device to a mobile receiving device. In some examples, each mmWave signal transmission path of a plurality of mmWave signal transmission paths may be identified. The signal transmission paths may include dominating paths between the mmWave transmitting device and the mobile receiving device. The underlying physical paths of the signal transmission paths may stay the same regardless of changes in channel gain and phase change brought on by steering different distinct beams to the path.

The machine-readable medium 224 may store instructions 228 executable by the processing resource 222 to perform, at each signal transmission path of the plurality of mmWave signal transmission paths, a multi-Gigahertz channel measurement of each beam of a first portion of beams available at the mmWave transmitting device. The multi-Gigahertz channel measurement may be performed by probing the first portion of beams along the plurality of mmWave signal transmission paths.

The first portion of beams may be an amount of beams that is independent of the number of beams that the mmWave transmitting device support. For example, the amount of the first portion of beams that will be probed may be 4K beams, where K is the number of identified mmWave signal transmission paths. K may be upper bounded by three. As such, the amount of the first portion of beams may be one of four beams, eight beams, or twelve beams to be probed for a channel measurement.

The machine-readable medium 224 may store instructions 230 executable by the processing resource 222 to determine a four-tuple of path-defining properties for each signal transmission path of the plurality of mmWave signal transmission paths. The four-tuple may be determined utilizing the multi-GHz channel measurement collected from probing the first portion of beams. The four-tuple of path-defining properties may include a path amplitude ($a_k$), a path phase ($\phi_k$), an azimuth direction ($\theta_k^{az}$), and an elevation direction ($\theta_k^{el}$) of the corresponding mmWave signal transmission path. The four-tuple of path-defining properties may be determined utilizing a dual space-time analysis of the multi-GHz channel measurements collected from probing the first portion of beams.

The machine-readable medium 224 may store instructions 232 executable by the processing resource 222 to predict a channel measurement for each beam of a second portion of the beams available at the mmWave transmitting device. The predicted channel measurement may not be determined by probing the second portion of beams. Instead, the predicted channel measurement may be predicted based on the four-tuple of path-defining properties determined by probing beams for each signal transmission path of the plurality of mmWave signal transmission paths. Additionally, the predicted channel measurements may be predicted utilizing a radiation pattern of each beam of the second portion of the beams. The radiation pattern may be known prior to predicting the channel measurements and may be saved to the mmWave transmitting device during its manufacture. By combining the known radiation pattern for each beam with the path properties, the mmWave transmitting device may predict a channel measurement for each beam available at the mmWave transmitting device steered along the mmWave signal transmission path without actually probing the channel. The predicted channel measurement may be utilized to determine a predicted performance corresponding to each beam available at the mmWave transmitting device. The predicted performance may include a predicted signal strength of each beam over the mmWave signal transmission path.

The machine-readable medium 224 may store instructions 234 executable by the processing resource 222 to rank each of the beams available at the mmWave signal transmitting device. Ranking each of the beams may include arranging the beams in an order according to a corresponding predicted performance of each of the beams. For example, ranking each of the beams may include placing the beams in a descending order of predicted performance and/or signal to noise ratio. In such examples, the rank may include a rank in descending order of beams to switch to from a currently utilized beam. In such examples, those beams appearing higher in the ranking may be beams predicted to provide a stronger signal strength for a data transmission link between the mmWave signal transmitting device and the receiving device.

The mmWave signal transmitting device may select a third portion of the beams available at the mmWave signal transmitting device according to their ranked order. The third portion may include a portion of the first portion and/or a portion of the second portion of the beams available at the mmWave signal transmitting device. The third portion of beams may include a portion of the first $\delta^3$ beams in their ranked order. That is, the highest ranked candidate beams to switch to from a currently utilized beam may be selected and an addition multi-GHz channel measurement of each beam of the third portion of beams may be performed. By physically probing a portion of the highest ranked candidate to collect channel measurements, the predictions may be validated and the order may be refined with respect to the first $\delta^3$ beams. Responsive to the validation and/or refinement of the ranking, a beam from the third portion of the beams may be selected and/or utilized to transmit a signal to the receiving device. For example, the beam from the third portion of beams may be selected to be utilized to transmit a signal to the receiving device based on the channel measurement collected by probing each of the third portion of the beams.

Figure 3:
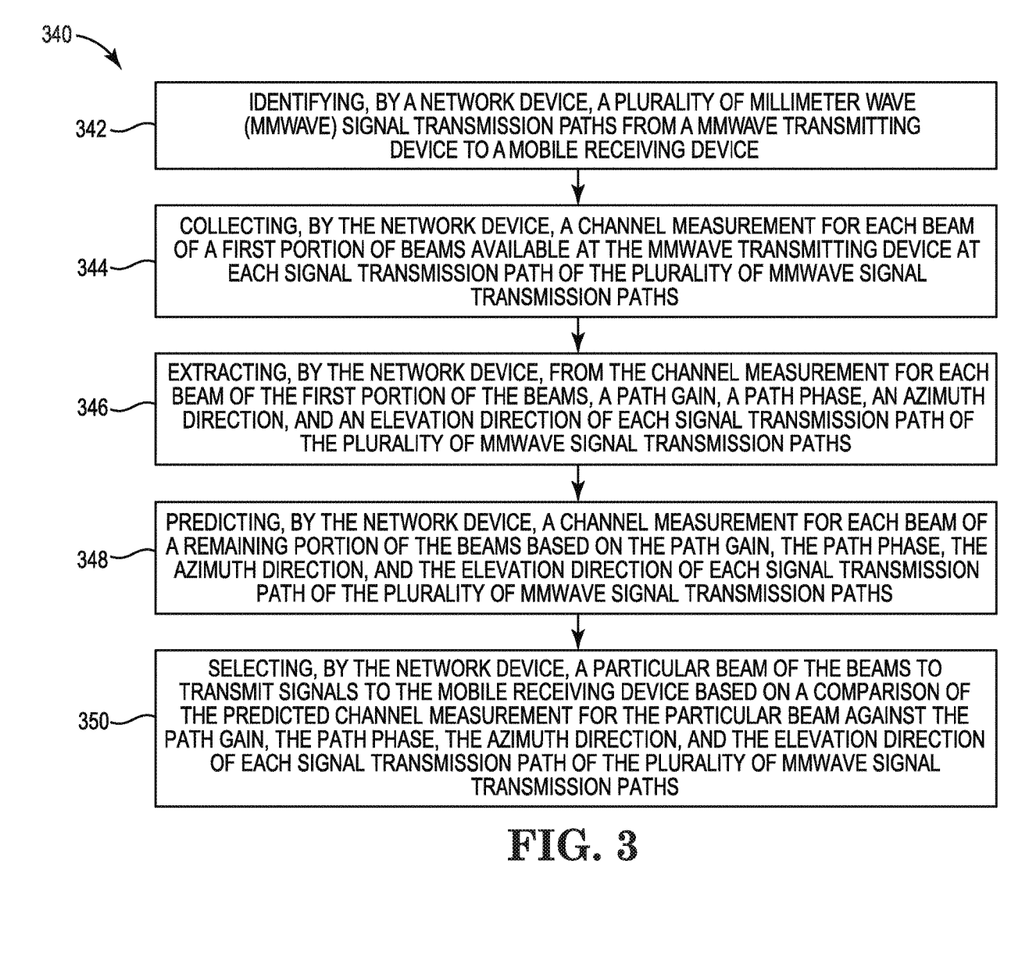
FIG. 3 illustrates a flow diagram of an example of a method for channel measurement beam selections consistent with the disclosure.

FIG. 3 illustrates a flow diagram of an example of a method 340 for channel measurement beam selections consistent with the disclosure. The method 340 is not limited to a particular example described herein and may include additional features such as those described in the system 100 and the non-transitory machine-readable storage medium 224 described in FIG. 2.

At 342, the method 340 may include identifying, by a network device, a plurality of mmWave signal transmission paths from an mmWave transmitting device to a mobile receiving device. The network device may include an access point, a mobile computing device associated with the access point, and/or a network controller on a computing network. Identifying the plurality of mmWave signal transmission paths may be triggered by an event on the computing network. For example, the network device may collect channel impulse response measurements for an initial beam utilized by the mmWave transmitting device to transmit initial signals from the mmWave transmitting device to the mobile receiving device. The network device may detect, from the collected channel impulse response, a reduction in a signal strength of the initial beam. In response to detecting the reduction in the signal strength of the initial beam, the network device may trigger the identifying of the plurality of mmWave signal transmission paths.

At 344, the method 340 may include collecting, by the network device, a channel measurement for each beam of a first portion of beams available at the mmWave transmitting device at each signal transmission path of the plurality of mmWave signal transmission paths. In examples, a radiation pattern of each beam of the beams available at the mmWave transmitting device may be stored on and/or available for reference at the mmWave transmitting device. The stored radiation patterns of each beam may be referenced to identify uncorrelated beams from the beams available at the mmWave transmitting device. Uncorrelated beams may include beams that are structurally dissimilar. Beams that have a relatively lowest amount of structural similarity with one another may be utilized as the first portion of the beams.

Each beam of the first portion of beams may be probed along the identified mmWave signal transmission paths. For example, a packet may be sent to the mobile computing device in each beam of the first portion of beams utilizing the identified mmWave signal transmission paths. A power delay profile of the packet for each beam of the first portion of beams may be received from the mobile device. The channel measurement for each beam of the first portion of the beams may be collected from the packet for each beam of the first portion of the beams.

At 346, the method 340 may include extracting, by the network device, the path gain, the path phase, an azimuth direction, and an elevation direction of each mmWave signal transmission path of the plurality of mmWave signal transmission paths available at the mmWave transmitting device beam of the first portion of beams. The path gain, the path phase, an azimuth direction, and an elevation direction may be extracted from the channel measurement for each beam of the first portion of beams probed along the mmWave signal transmission paths. The amount of channel probes performed when collecting the channel measurements may be independent of the amount of beams supported by the mmWave transmitting device. The amount of probed beams may be equal to four multiplied by the amount of identified dominant mmWave signal transmission paths between the mmWave transmitting device and the receiving device.

At 348, the method 340 may include predicting, by the network device, a channel measurement for each beam of a remaining portion of the beams available at the mmWave transmitting device. The channel measurement prediction may be based on the extracted path gain, the path phase, the azimuth direction, and the elevation of each signal transmission path of the plurality of mmWave signal transmission paths. The channel measurement for each beam may also be based on a corresponding established beam radiation pattern.

At 350, the method 340 may include selecting, by the network device, a particular beam of the beams available to transmit data from the mmWave transmitting device. The particular beam may be selected to transmit a future signal between the mobile receiving device and the mmWave transmitting device. The particular beam may be selected based on a comparison of the predicted channel measurement for the particular beam against the path gain, the path phase, the azimuth direction, and the elevation direction of each signal transmission path of the plurality of mmWave signal transmission paths available at the mmWave transmitting device. For example, the particular beam that matches the path gain, the path phase, the azimuth direction, and the elevation direction of a dominant signal transmission path may be selected to be utilized to transmit signals to the mobile receiving device over the dominant signal transmission path.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a plurality of additional examples of the present disclosure. In addition, the proportion and the relative scale of the elements provided in the figures are intended to illustrate the examples of the present disclosure, and should not be taken in a limiting sense.

What is claimed:

1. A system comprising:
    a millimeter wave (mmWave) transmitting device comprising a processor and a memory, the memory including instructions to:
        identify a plurality of mmWave signal transmission paths to a receiving device;
        collect a channel measurement for each beam of a first portion of beams at each signal transmission path of the plurality of mmWave signal transmission paths;
        determine a plurality of properties of each signal transmission path of the plurality of mmWave signal transmission paths utilizing the corresponding channel measurements;
        predict, based on the plurality of properties, a signal metric for a second portion of the beams; and
        select a beam from the beams with a predicted signal metric indicating that the beam will provide a strongest signal relative to the other beams, to be utilized to transmit a signal to the receiving device; and
        transmit a signal to the receiving device using the selected beam.

2. The system of claim 1, wherein an amount of beams in the first portion of beams is independent from an amount of beams available at the millimeter Wave (mmWave) transmitting device.

3. The system of claim 1, wherein an amount of beams in the first portion of beams is determined by multiplying four by an amount of the plurality of paths.

4. The system of claim 1, wherein the first portion of beams are selected based on a structural similarity metric characterizing a structural overlap of a radiation pattern of each beam available at the millimeter Wave (mmWave) transmitting device.

5. The system of claim 1, wherein the plurality of properties of each signal transmission path include a path-characterizing four-tuple of properties of each signal path of the plurality of mmWave signal transmission paths determined utilizing a dual-space time analysis of the corresponding collected channel measurements.

6. The system of claim 5, wherein the four-tuple includes a path amplitude of the corresponding mmWave signal transmission path.

7. The system of claim 5, wherein the four-tuple includes a path phase of the corresponding mmWave signal transmission path.

8. The system of claim 5, wherein the four-tuple includes an azimuth direction of the corresponding mmWave signal transmission path.

9. The system of claim 5, wherein the four-tuple includes an elevation direction of the corresponding mmWave signal transmission path.

10. The system of claim 1, wherein the mmWave transmitting device utilizes a phased-array antenna to transmit to the receiving device.

11. A non-transitory machine-readable storage medium having stored thereon machine-readable instructions to cause a processor to:
identify a plurality of millimeter Wave (mmWave) signal transmission paths from a mmWave transmitting device to a mobile receiving device;
perform, at each signal transmission path of the plurality of mmWave signal transmission paths, a multi-Gigahertz (GHz) channel measurement of each beam of a first portion of beams available at the mmWave transmitting device;
determine a four-tuple of path-defining properties for each signal transmission path of the plurality of mmWave signal transmission paths utilizing the corresponding multi-GHz channel measurement;
predict a channel measurement for each beam of a second portion of the beams based on the determined four-tuple of path-defining properties for each signal transmission path of the plurality of mmWave signal transmission paths;
rank each of the beams available at the mmWave transmitting device in an order according to a corresponding predicted performance of each of the beams as determined from the corresponding channel measurement;
select a beam to transmit a signal to the mobile receiving device based on a ranking of each of the available beams; and
transmit a signal to the mobile receiving device using the selected beam.

12. The medium of claim 11, including instructions to:
select a third portion of the beams according to the ranked order; and
perform an additional multi-Gigahertz (GHz) channel measurement of each beam of the third portion of the beams.

13. The medium of claim 12, including instructions to select a beam from the third portion of the beams to be utilized to transmit a signal to the mobile receiving device based on the channel measurement of each beam of the third portion of the beams.

14. The medium of claim 11, including instructions to utilize a stored radiation pattern of each beam of the second portion of the beams to predict channel measurement for each beam of the second portion of the beams.

15. A method comprising:
identifying, by a network device, a plurality of millimeter Wave (mmWave) signal transmission paths from a mmWave transmitting device to a mobile receiving device;
collecting, by the network device, a channel measurement for each beam of a first portion of beams available at the mmWave transmitting device at each signal transmission path of the plurality of mmWave signal transmission paths;
extracting, by the network device, from the channel measurement for each beam of the first portion of the beams, a path gain, a path phase, an azimuth direction, and an elevation direction of each signal transmission path of the plurality of mmWave signal transmission paths;
predicting, by the network device, a channel measurement for each beam of a remaining portion of the beams based on the path gain, the path phase, the azimuth direction, and the elevation direction of each signal transmission path of the plurality of mmWave signal transmission paths;
selecting, by the network device, a particular beam of the beams to transmit signals to the mobile receiving device based on a comparison of the predicted channel measurement for the particular beam against the path gain, the path phase, the azimuth direction, and the elevation direction of each signal transmission path of the plurality of mmWave signal transmission paths; and
transmit, by the network device, signals to the mobile receiving device using the particular beam.

16. The method of claim 15, comprising collecting a channel impulse response measurement for an initial beam utilized by the mmWave transmitting device to transmit initial signals to the mobile receiving device.

17. The method of claim 16, comprising detecting, from the collected channel impulse response, a reduction in a signal strength of the initial beam.

18. The method of claim 17, comprising triggering the identifying of the plurality of millimeter Wave (mmWave) signal transmission paths based on detecting the reduction in the signal strength of the initial beam.

19. The method of claim 15, referencing a stored radiation pattern of each beam of the beams available at the mmWave transmitting device to identify uncorrelated beams from the beams available at the mmWave transmitting device to utilize as the first portion of the beams.

20. The method of claim 15, comprising:
sending a packet to the mobile receiving device in each beam of the first portion of the beams;
receiving, from the mobile receiving device, a power delay profile of the packet for each beam of the first portion of the beams; and
collecting the channel measurement for each beam of the first portion of the beams from the packet for each beam of the first portion of the beams.

* * * * *